United States Patent [19]
Poque et al.

[11] 3,945,421
[45] Mar. 23, 1976

[54] REINFORCEMENT PLY IN THE FORM OF A BELT FOR PNEUMATIC TIRES FOR VEHICLES

[75] Inventors: Dionysius Josef Poqué, Aachen-Brand; Gerhard Franz-Josef Senger, Aachen; Hans Jurgen Vogler, Herzogenrath-Merkstein, all of Germany

[73] Assignee: Uniroyal Aktiengesellschaft, Aachen, Germany

[22] Filed: Oct. 25, 1974

[21] Appl. No.: 518,024

[30] Foreign Application Priority Data
Nov. 6, 1973    Germany............................ 2355338

[52] U.S. Cl............................. 152/361 FP; 152/374
[51] Int. Cl.² .......................................... B60C 9/18
[58] Field of Search .......... 152/361 FP, 361 R, 354, 152/374

[56] References Cited
UNITED STATES PATENTS
3,692,080   9/1972   Boileau ........................ 152/361 FP
3,799,230   3/1974   Montagne ..................... 152/361 FP
3,831,657   8/1974   Dillenschneider............. 152/361 FP FOREIGN PATENTS OR APPLICATIONS
102,826   10/1962   Netherlands................... 152/361 FP Primary Examiner—Drayton E. Hoffman
Attorney, Agent, or Firm—Lawrence E. Sklar

[57] ABSTRACT

Reinforcement for a pneumatic tire for vehicles, comprising a first, inner belt ply, a pair of lateral strips connected to the free edges of the inner belt ply, the lateral strips and the inner belt ply lying in substantially the same plane, and a second, outer belt ply having a pair of opposed flanges which fold over and hem in the lateral strips and at least the marginal areas of the inner belt ply. The lateral strips are substantially spaced apart from the folded edges of the outer belt ply, so that the outer belt ply is superpositioned on itself in the areas between the folded edges of the outer belt ply and the free edges of the lateral strips.

10 Claims, 4 Drawing Figures

REINFORCEMENT PLY IN THE FORM OF A BELT FOR PNEUMATIC TIRES FOR VEHICLES

BACKGROUND OF THE INVENTION

The invention relates to reinforcement for pneumatic tires for vehicles, consisting of a first belt ply having adjacent its edges lateral strips consisting of a plastic or rubber mixture, and a second belt ply whose marginal portions are folded over to hem in the lateral strips.

A reinforcement ply is disclosed in the Italian Pat. No. 514,343 having a substantially thick first belt ply and lateral strips connected directly to the two outer edges of the first belt ply. The strips continuously decrease in thickness from a starting thickness equal to the thickness of the first belt ply and extend toward the outside of the reinforcement into the area of the folded edge of a second belt ply. The folded over marginal portions of the second belt ply completely enclose the lateral strips, but extend only slightly beyond the outer edges of the first belt ply to barely cover the gap between the outer edges of the first belt ply and its adjacent lateral strips. The large radial thickness of the first belt ply together with the corresponding large radial thickness of the lateral strips results in a relatively large radial thickness of the reinforcement ply. However, this reinforcement construction exhibits adjacent tire width zones of highly differing strength or rigidity wherein the rigidity values experience abrupt changes at the transition points between adjacent zones.

SUMMARY OF THE INVENTION

It is therefore an object of the instant invention to create a reinforcement construction for pneumatic tires which overcomes the problems of the prior art discussed above and which is particularly suitable for high vehicle speeds. It is a further object to provide a reinforcement construction wherein the rigidity values decrease gradually from a maximum at the equatorial plane of the tire toward a minimum in the shoulder area of the tire. To these ends, the instant invention provides a reinforcement for a pneumatic tire for vehicles, comprising a first, inner belt ply, a pair of lateral strips connected to the free edges of the inner belt ply, the lateral strips and the inner belt ply lying in substantially the same plane and a second, outer belt ply having a pair of opposed flanges which fold over and hem in the lateral strips and at least the marginal area of the inner belt ply. The lateral strips are substantially spaced apart from the folded edge of the outer belt ply, so that the outer belt ply is superpositioned on itself in the areas between the folded edges of the outer belt ply and the free edges of the lateral strips.

DESCRIPTION OF THE PREFERRED EMBODIMENT

Figure 1:
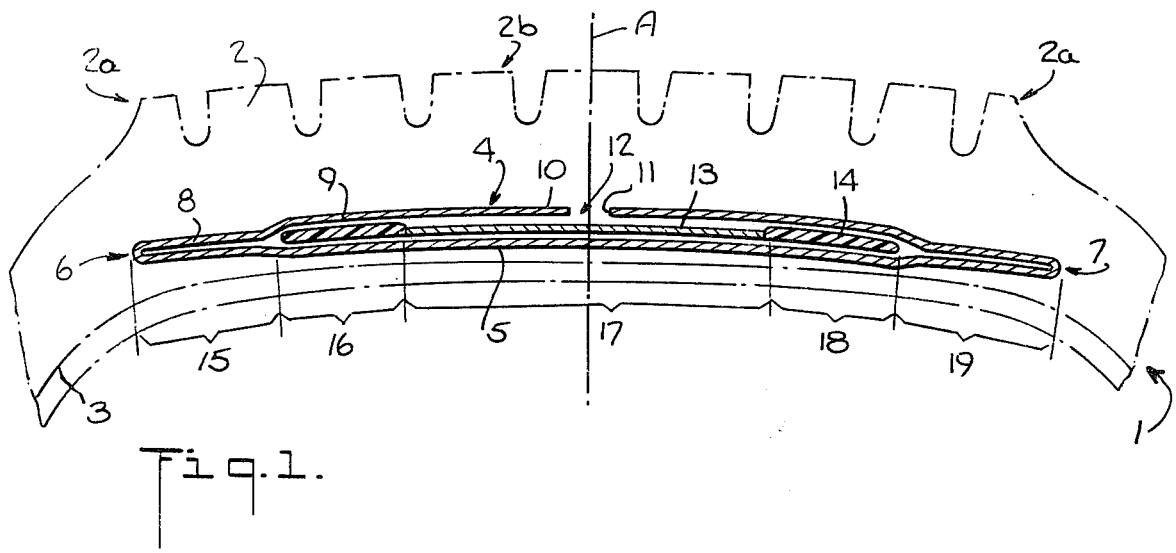
FIG. 1 is a cross-sectional view of a reinforcement construction in accordance with the instant invention in a first embodiment and depicts its position in a pneumatic tire.

In the tire reinforcement of the instant invention, folded-over marginal portions of a second, outer belt ply hem in the marginal portions of a first belt ply and lateral strips adjacent thereto, which terminate, in each case, at a predetermined minimum distance from the folded edges of the second belt ply. It should be noted that the lateral strips form zones of a rigidity compensation as well as providing precise gradation of the rigidity from a maximum in the crown area to a minimum in the lateral zones of the reinforcement. This arrangement provides a more uniform distribution of rigidity and smoother transitions between adjacent zones than is known with present tire constructions.

The preferred arrangement is that each superpositioned area of the second belt ply is superpositioned over a width of at least 4% of the width of the tire, measuring from the neutral fiber of the folded edge to the equatorial plane of the tire. Thus, with a tire in accordance with the invention, the lateral strips extend in no event up to the folded edge of the second belt ply. Rather, there remains always an area contiguous to the folded edge that is free from a lateral strip.

Each lateral strip exhibits a width between about 4% and about 15%, preferably between approximately 7 and 10%, of the width of the tire, measuring from each outer edge of the first belt ply in the direction away from the equatorial plane of the tire.

In the case of the arrangement and design of the reinforcement in accordance with the invention, one achieves a subdividing of the reinforcement into five zones. In the crown area, there exists a zone in which there are essentially superpositioned three cord fabric plies. This zone is framed on either side by two zones in which there occurs a compensation of the rigidity and a precision gradation of the rigidity. In these compensation zones there is situated in each case a side strip layer between two cord fabric plies. The two outer zones which extend up to the folded edge of the second belt ply are defined by two cord plies directly superpositioned on one another.

The structural elements of the reinforcement can be attuned in the various zones depending on the choice of material and their cross-section in such a way that the desired precision gradation of the rigidity and the non-abrupt transitions at the borders of adjoining zones can be materialized. Such a reinforcement results in a tire suitable for high speeds with extraordinary satisfactory stability, resistance to rolling, and abrasion behavior. It is essential for the long life of a tire, and it is the case with the instant invention, that the cord fabric of the folded belt extend practically without any bend over all zones. As a result, there is achived a uniform distribution of tension. It should also be noted that in addition to providing the property of the precision gradation of the rigidity, the lateral strips can also be used as an aid in the folding of the second belt ply.

The lateral strips preferably consist of a rubber mixture conventionally used in the calendering of tire cord fabrics. In some instances it may be advantageous if the rubber mixture of the lateral strips differs from that of the cord fabrics, in particular with regard to hardness and/or modulus of elasticity. Thus, the rubber mixture can additionally be reinforced through embedded fibers. The lateral strips may also consist of a plastic material.

Preferably, the modulus of elasticity of the cords (filaments, wires) of the cord fabric plies are selected to be identical to or greater than the modulus of elasticity of the lateral strips.

With high-speed tires, the reinforcing cord fabric plies generally comprise steel cords. In that case, the individual cord elements or wires, especially those in the second belt ply, are to have the smallest possible cross-section. The first belt ply can consist of steel cord fabrics in which the steel elements can, however, exhibit a greater cross-section. It is of course understood that cord fabrics other than steel cord are suitable for the purposes of the invention.

Referring now to the drawings, in FIG. 1, the dash-dot line suggests the outer area of a belted tire, in particular a high-speed tire. This tire is designated by the reference numeral 1. It has a crown area 2 defined by shoulders 2a and by a profiled tread 2b. Moreover, the tire 1 is provided with a carcass 3 which may be built up in conventional manner. Between the carcass 3 and the tread 2b, there is arranged a reinforcement generally designated 4 consisting of a first, inner ply 13 and a second, outer ply 5. The outer ply 5 generally exhibits a substantially greater width than the remainder of the reinforcement, and is folded at its marginal edges 6 and 7 with the two free edges 11 facing one another and separated by a short distance forming a gap 12.

The folded-over outer belt ply 5 encloses within its folded areas two lateral strips 14 and the inner belt ply 13 therebetween. The inner belt ply 13 is arranged symmetrically about the equatorial plane A just as, in general, the reinforcement ply is built up symmetrically to this plane. It can be seen that the lateral strips 14 connect substantially in the same plane directly to the free edges of the inner belt ply 13. However, the lateral strips 14 extend only partly into the folded area of the outer belt ply 5. The outer edges of the lateral strips 14 are substantially spaced apart from the folded edges 6 and 7 of the outer belt ply 5. Each of the two folded over areas of this outer belt ply 5 therefore exhibits three sections, namely a first section 8 adjoining the folded edge, which consists essentially of the continuous area of the outer belt ply 5, a second section 9 including the lateral strips, and a third section 10 essentially including the inner belt ply 13.

The reinforcement construction illustrated in FIG. 1 therefore forms essentially five zones of differential rigidity. In the central zone 17, the rigidity is determined by three superpositioned cord plies. In the two adjoining zones 16 and 18, the rigidity is determined by two cord plies spaced from one another by a lateral strip enclosed therebetween. However, in the outer zones 15 and 19, the rigidity is determined by two superpositioned cord plies interconnected via the folded edge 6 and 7, respectively. It can be seen that the outer zones 15 and 19 are situated in the shoulder area of the tire.

The zones 16 and 18 form between the central zone 17 and the outer zones 15 and 19 respectively, transition and compensating steps which assure that the rigidity values are decreased from the inside to the outside smoothly and without any abrupt transitions. The zones 16 and 18 also provide a precision gradation of the strength characteristics in these areas and at the transition points to the adjoining zones.

The overall width of the reinforcement 4 may amount to 75% of the overall width of the tire. However, manufacturing tolerances of ± 15% are to be taken into consideration. The width of each lateral strip is preferably between approximately 4% and approximately 15% of the width of the tire, and a width in the range between 7 and 10% of the tire width has proven to be particularly advantageous. Of particular significance is the distance between each free outer edge of the lateral strip and the adjacent neutral fiber or zone of the folded edge of the outer belt ply 5, which distance may not be less than a value of 4% of the tire width. This distance may amount, at the maximum, to 13% of the tire width, with the preferred range being between 7 and 10% of the tire width. The distance depends, in each case, on the tire dimensions and on the intended use of the tire, e.g., a high-speed tire for passenger vehicles or a tire for trucks.

Figure 2:
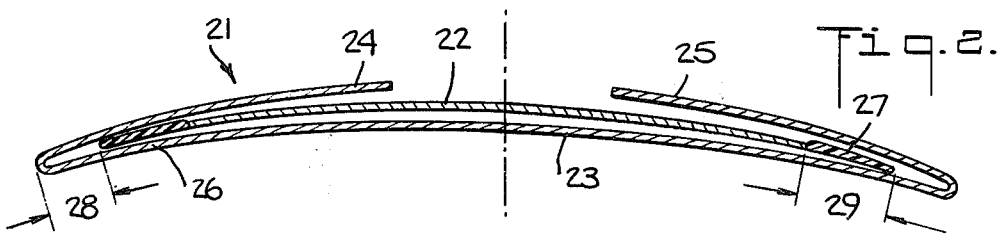
FIG. 2 is a cross-sectional view of a reinforcement construction in a second embodiment.

With the reinforcement 21 in accordance with FIG. 2, there is provided an essentially similar structure. The outer ply 23 wraps with its flanges 24 around the lateral strips 26 and 27 and the inner belt ply 22. The distance of the free edge of the lateral strips from the folded edge of the outer ply 23 is designated by the numeral 28 and the width of the lateral strip is designated by the numeral 29. In the example shown in FIG. 2, the gap between the free edges of the folded over area 24 and 25 is larger than in the case of the exemplified embodiment in accordance with FIG. 1.

Figure 3:
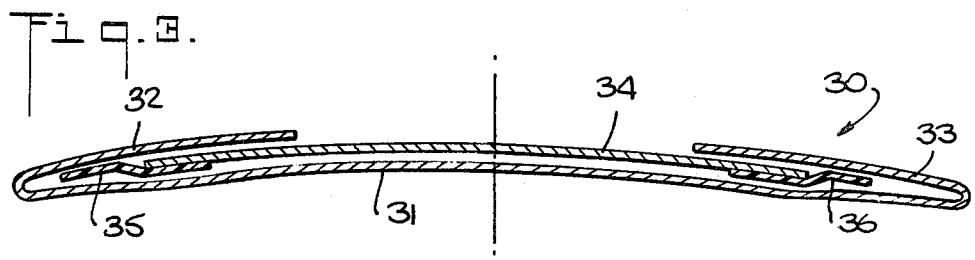
FIG. 3 is a cross-sectional view of a third embodiment of the invention.

The exemplified embodiment of the reinforcement in accordance with FIG. 3 differs from the two preceding embodiments in that the lateral strips 35 and 36 are arranged in such a way that they partially overlap the marginal areas of the inner belt 34. The outer belt ply 31 is folded over with the folded over flanges 32 and 33 of the reinforcement 30 overlapping both the exposed area of the lateral strips, the overlapping areas of the lateral strips and inner belt, and a part of the inner belt ply 34. The lateral strips may overlap above or beneath the inner belt ply.

Figure 4:
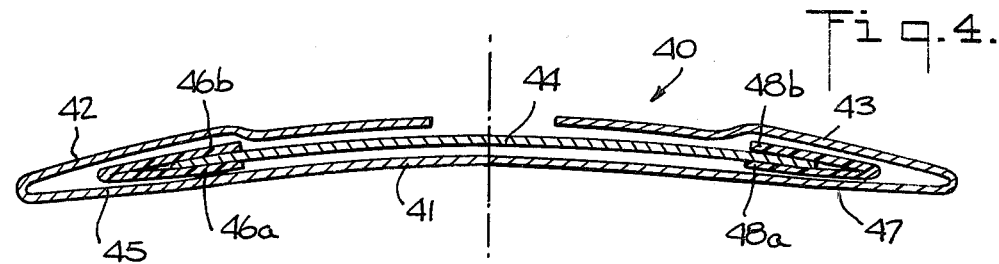
FIG. 4 is a cross-sectional view of a fourth embodiment of the invention.

In the case of the exemplified embodiment in accordance with FIG. 4, the lateral strips of the reinforcement 40 are designed as folded strips 45 and 47. These folded strips wrap around the inner belt ply 44 and form with the edge areas thereof overlapping sites 46a, 46b and 48a, 48b respectively above and beneath the inner belt ply 44. Also in this case, the outer belt ply 41 is folded and its folded flanges 42 and 43 overlap the lateral strips, the overlapping sites, and the essential areas of the inner belt 44.

In the case of all exemplified embodiments, the plies, in particular the outer ply, run substantially bend-free over all zones. The lateral strips in this arrangement form a precision-sensitive means for the gradation of the rigidity. It ought to be noted that this gradation can be influenced not only by the differential gradation, in accordance with the exemplified embodiments, but also by the cross-sectional configuration of the lateral strips. In the latter situation, it may be appropriate that the cross-section of the lateral strips decreases from the inside to the outside of the tire width.

Moreover, the outer belt ply can be designed in such a way that the gap between its free edges is present merely as a separation. Furthermore, the outer belt ply may be arranged symmetrically or asymmetrically with respect to the equatorial plane.

What is claimed is:

1. Reinforcements for a pneumatic tire for vehicles, comprising:
a first, inner belt ply;

a pair of lateral strips connected to the free edges of the inner belt ply, said lateral strips and inner belt ply lying in substantially the same plane; and a second, outer belt ply having a pair of opposed flanges which fold over and hem in the lateral strips and at least the marginal areas of the inner belt ply, and wherein the lateral strips are substantially spaced apart from the folded edges of the outer belt ply, so that the outer belt ply is superpositioned on itself in the areas between the folded edges of the outer belt ply and the free edge of the lateral strips, each superpositioned area of the outer belt comprising a width of at least 4% of the width of the tire, whereby the tire rigidity values decrease gradually from a maximum at the equatorial plane of the tire towards a minimum in the shoulder area of the tire.

2. The reinforcement of claim 1, wherein each superpositioned area of the outer belt ply comprises a width of at least 7% of the width of the tire.

3. The reinforcement of claim 1, wherein each lateral strip comprises a width between about 4% and 15% of the tire width.

4. The reinforcement of claim 1, wherein each lateral strip comprises a width between about 7% and 10% of the tire width.

5. The reinforcement of claim 1, wherein the lateral strips comprise a rubber mixture identical to the rubber mixture of the inner belt ply.

6. The reinforcement of claim 1, wherein the lateral strips comprise a rubber mixture reinforced with fibrous material.

7. The reinforcement of claim 6, wherein the modulus of elasticity of the lateral strips is identical to or smaller than that of the cords of the belt plies.

8. The reinforcement of claim 6, wherein the thickness of the lateral strips decreases in the direction away from the equatorial plane of the tire.

9. The reinforcement of claim 1, wherein each lateral strip comprises a folded strip which wraps around a free edge of the inner belt ply.

10. The reinforcement of claim 1, wherein each lateral strip overlaps a marginal area of the inner belt ply.

* * * * *